US012671299B2

(12) United States Patent
Jantel et al.

(10) Patent No.: US 12,671,299 B2
(45) Date of Patent: Jun. 30, 2026

(54) COOLING DEVICE FOR AN ELECTRIC DRIVE TRAIN COMPONENT, ELECTRIC DRIVE TRAIN ASSEMBLY, METHOD FOR OPERATING A COOLING DEVICE, METHOD FOR COOLING AN ELECTRIC DRIVE TRAIN COMPONENT, AND VEHICLE

(71) Applicant: Volvo Car Corporation, Gothenburg (SE)

(72) Inventors: Ugo Jantel, Gothenburg (SE); Emil Åberg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 193 days.

(21) Appl. No.: 18/492,885

(22) Filed: Oct. 24, 2023

(65) Prior Publication Data

US 2024/0162784 A1 May 16, 2024

(30) Foreign Application Priority Data

Nov. 15, 2022 (EP) ..................................... 22207598

(51) Int. Cl.
| | |
|---|---|
| *H02K 9/18* | (2006.01) |
| *H02K 7/00* | (2006.01) |
| *H02K 9/20* | (2006.01) |

(52) U.S. Cl.
CPC .............. *H02K 9/18* (2013.01); *H02K 7/006* (2013.01); *H02K 9/20* (2013.01); *H02K 2209/00* (2013.01)

(58) Field of Classification Search
CPC ..... B60K 1/00; B60K 11/02; B60K 2001/005
See application file for complete search history.

(56) References Cited

U.S. PATENT DOCUMENTS

| | | | | |
|---|---|---|---|---|
| 2004/0222711 A1* | 11/2004 | Klimt | ...................... | H02K 9/18 310/59 |
| 2005/0194847 A1 | 9/2005 | Gromoll et al. | | |

(Continued)

FOREIGN PATENT DOCUMENTS

| | | |
|---|---|---|
| DE | 102011115279 A1 | 12/2012 |
| DE | 102021110135 B3 | 8/2022 |

(Continued)

OTHER PUBLICATIONS

WO-2011044964-A1, all pages (Year: 2011).*

(Continued)

*Primary Examiner* — Naishadh N Desai
(74) *Attorney, Agent, or Firm* — Amin, Turocy & Watson, LLP

(57) ABSTRACT

A cooling device for an electric drive train component can comprise a coolant inlet port configured to receive gaseous coolant from the electric drive train component, a coolant outlet port configured to deliver liquid coolant to the electric drive train component, a heat exchanger configured to extract heat from the gaseous coolant such that the gaseous coolant is at least partially transformed into liquid coolant, wherein the heat exchanger is fluidically connected to the coolant inlet port and the coolant outlet port such that the heat exchanger is arranged between the coolant inlet port and the coolant outlet port along a coolant flow direction, and a coolant collection channel fluidically connected to the heat exchanger and the coolant outlet port such that the coolant collection channel is arranged between the heat exchanger and the coolant outlet port along the coolant flow direction.

20 Claims, 3 Drawing Sheets

(56)  References Cited

U.S. PATENT DOCUMENTS

| | | | |
|---|---|---|---|
| 2016/0164378 A1* | 6/2016 | Gauthier ................. | H02K 9/19 |
| | | | 310/54 |
| 2019/0291570 A1* | 9/2019 | Tang ...................... | B60K 11/04 |
| 2021/0347245 A1 | 11/2021 | Dlala et al. | |
| 2022/0090534 A1* | 3/2022 | Friske ..................... | B60K 1/00 |

FOREIGN PATENT DOCUMENTS

| | | | | |
|---|---|---|---|---|
| EP | 2 119 993 A1 | 11/2009 | | |
| EP | 2505404 A2 | 10/2012 | | |
| WO | WO-2011044964 A1 * | 4/2011 | .............. | B60K 1/00 |
| WO | 2019182622 A | 9/2019 | | |

OTHER PUBLICATIONS

Extended European Search Report received for European Application Ser. No. 22207598.8 dated May 8, 2023, 8 pages.
Communication pursuant to Article 94(3) EPC received for EP Patent Application Serial No. 22207598.8 dated Aug. 11, 2025, 04 pages.
Rensselar, "Driveline Fluids For Electric Vehicles," TLT Cover Story, Society of Tribologists and Lubrication Engineers, Published: Aug. 2021, 7 pages (the entire document), self-published by Jeanna Van Rensselar, Naperville, IL, United States of America.

* cited by examiner

COOLING DEVICE FOR AN ELECTRIC DRIVE TRAIN COMPONENT, ELECTRIC DRIVE TRAIN ASSEMBLY, METHOD FOR OPERATING A COOLING DEVICE, METHOD FOR COOLING AN ELECTRIC DRIVE TRAIN COMPONENT, AND VEHICLE

CROSS-REFERENCE TO RELATED APPLICATIONS

This application claims the benefit of and priority to pending EP patent application serial number 22207598.8, filed Nov. 15, 2022, and entitled "COOLING DEVICE FOR AN ELECTRIC DRIVE TRAIN COMPONENT, ELECTRIC DRIVE TRAIN ASSEMBLY, METHOD FOR OPERATING A COOLING DEVICE, METHOD FOR COOLING AN ELECTRIC DRIVE TRAIN COMPONENT, AND VEHICLE," the entirety of which is hereby incorporated by reference herein.

TECHNICAL FIELD

The present disclosure relates to vehicles and, more particularly, to cooling an electric drive train component.

BACKGROUND

In operation, a temperature of electric drivetrain components, especially of electric machines, can be controlled in order to enhance the performance and/or the lifetime of the electric drivetrain components. To this end, cooling devices are used.

SUMMARY

The problem is at least partially solved or alleviated by the subject matter of the independent claims of the present disclosure, wherein further examples are incorporated in the dependent claims.

It is an objective of the present disclosure to improve such cooling devices. The present disclosure relates to a cooling device for an electric drive train component. Additionally, the present disclosure is directed to an electric drive train assembly comprising an electric machine and such a cooling device. Furthermore, the present disclosure relates to a method for operating a cooling device for an electric drive train component and to a method for cooling an electric drive train component. The present disclosure also relates to a vehicle comprising an electric drive train assembly as mentioned above.

According to a first aspect, there is provided a cooling device for an electric drive train component. The cooling device comprises a coolant inlet port being configured to receive gaseous coolant from the electric drive train component and a coolant outlet port being configured to deliver liquid coolant to the electric drive train component. The cooling device additionally comprises a heat exchanger being configured to extract heat from the gaseous coolant such that the gaseous coolant is at least partially transformed into liquid coolant. The heat exchanger is fluidically connected to the coolant inlet port and the coolant outlet port such that the heat exchanger is arranged between the coolant inlet port and the coolant outlet port along a coolant flow direction. Additionally, the cooling device comprises a coolant collection channel being fluidically connected to the heat exchanger and the coolant outlet port such that the coolant collection channel is arranged between the heat exchanger and the coolant outlet port along the coolant flow direction. The coolant collection channel has an end being arranged adjacent to the coolant outlet port. This end is located on a lower vertical level than the heat exchanger in an operational position of the cooling device. Thus, the cooling device relies on the effect that the coolant changes its state of aggregation when in use. This means that using such a cooling device, at least a portion of the coolant is gasified or vaporized when being in contact with hot or warm parts of the electric drivetrain component. This has a cooling effect on the electric drivetrain component. In the heat exchanger, the coolant is at least partially condensed, i.e., transferred from the gaseous state into a liquid state. Thus, using the heat exchanger, the coolant is returned to the liquid state in a reliable and controlled manner. Such a cooling device is highly performant in that it allows to extract a comparatively big amount of heat from the electric drivetrain component. The arrangement of the end of the coolant collection channel on a lower vertical level than the heat exchanger allows to reliably and efficiently collect coolant exiting the heat exchanger. Since the condensed coolant is driven at least partially along the vertical direction by gravity, it creates a suction effect moving additional gaseous coolant into the heat exchanger. To this end, the coolant collection channel may at least partially extend vertically. Consequently, the coolant is drawn into the heat exchanger. This has the effect that always a sufficient amount of coolant in the liquid state may be provided by the cooling device. Thereby, the cooling device allows to control the temperature of the electric drivetrain component in an efficient, effective, and reliable manner.

The cooling device may be configured to be filled with a water-based coolant. Consequently, when in operation, the desired heat transfer may be realized using this water-based coolant.

The fact that the coolant collection channel may at least partially extend vertically in an operational position of the cooling device means that the respective portion of the coolant collection channel has at least a component of extension in the vertical direction. Preferably, the component of extension in the vertical direction is the biggest component of extension as compared to other directions, e.g., a horizontal direction. In an example, the entire coolant collection channel extends vertically.

The electric drivetrain component may for example be an electric machine or a transmission or a combination of an electric machine and a transmission.

It is noted that in the present disclosure, the term coolant is used. Of course, in an application, the same substance may be used as a coolant and as a lubricant. For the ease of explanation, combined lubrication and cooling substances will be designated as coolants.

In an example, the coolant collection channel is arranged below the heat exchanger in an operational position of the cooling device. This allows for a compact configuration of the cooling device. Furthermore, the above-described suction effect is enhanced.

In an example, a cross section of at least a portion of the coolant collection channel decreases along the coolant flow direction or is substantially constant along the coolant flow direction. In other words, the coolant collection channel may be shaped like a funnel or like a tube. In both alternatives, the condensed coolant is collected in a reliable manner.

In an example, the coolant collection channel may be formed by a straight tube segment or a straight pipe segment.

In an example, the cross section decreases continuously. This means that the cross section does not have abrupt or step-like changes. This facilitates the flow of coolant inside the coolant collection channel. Furthermore, this configuration helps to achieve a uniform distribution of the pressure inside the cooling device.

In an example, the heat exchanger is a gas-to-gas heat exchanger being configured to deliver heat to ambient air. Thus, the heat which is extracted from the coolant in order to transfer the coolant from the gaseous state into the liquid state is transferred to ambient air. Such a heat exchanger is structurally simple. Moreover, since ambient air is omnipresent, no further installations are necessary in order to dissipate the heat from the heat exchanger.

In an example, the cooling device further comprises a reservoir comprising a heat absorption liquid. The heat exchanger is a gas-to-liquid heat exchanger being thermally coupled to the reservoir. Thus, the heat which is extracted from the coolant in order to transfer the coolant from the gaseous state into the liquid state is transferred to the heat absorption liquid in the reservoir. The thermal coupling between the heat exchanger and the heat absorption liquid in the reservoir may be very efficient such that effective and efficient cooling may be achieved by such a heat exchanger. Thereby, the heat absorption liquid is heated. In this example, a temperature of the ambient air is not or just slightly influenced by the heat exchanger. This may be an advantage in applications which rely on constant environmental conditions.

In an example, the cooling device comprises a coolant which is a water-based coolant. For the present disclosure, a water-based coolant is a coolant which comprises at least 50 weight percent of water. An example of a water-based coolant is a mixture of water and glycol. Such a coolant provides a good cooling performance and at the same time is environmentally friendly and not dangerous.

According to a second aspect, there is provided an electric drive train assembly comprising an electric machine and a cooling device according to the present disclosure. The electric machine comprises a coolant circulation channel system being fluidically connected to the coolant inlet port and to the coolant outlet port of the cooling device. Consequently, the electric machine may be cooled using the cooling device according to the present disclosure. In more detail, coolant circulating through the coolant circulation channel system of the electric machine may be at least partially vaporized. Then, the at least partially vaporized coolant may enter the cooling device via the coolant inlet port and may be at least partially condensed using the heat exchanger of the cooling device. In other words, the vaporized coolant is returned into the liquid state using the heat exchange of the cooling device. Thus, coolant in liquid form can be provided to the coolant circulation channel system of the electric machine via the coolant outlet port of the cooling device. Consequently, the electric machine may be cooled in an effective and efficient manner.

In an example, the electric machine comprises stator windings and a rotor. The coolant circulation channel system of the electric machine may at least partially extend through the stator windings. Thus, coolant may flow adjacent to the locations where actually heat is generated while operating the electric machine. The cooling performance is enhanced.

In an example, at least a portion of at least one of the coolant collection channel and the heat exchanger is at least partially integrated into the electric machine. This renders the electric drivetrain assembly compact. At the same time, the electric drivetrain assembly is structurally simple since relatively few parts are needed. Furthermore, comparatively little coolant is needed since the distance that the coolant needs to travel between the coolant circulation channel system of the electric machine and the cooling device is comparatively small.

In an example, the coolant collection channel of the cooling device is at least partially integrated into a housing of the electric machine. Consequently, the electric drivetrain assembly is very compact.

In an example, the electric drive train assembly further comprises a transmission being drivingly connected to the electric machine. The transmission comprises a coolant circulation channel system being fluidically connected to the coolant inlet port and to the coolant outlet port of the cooling device. It has to be noted that the fluidic connection of the coolant circulation channel system of the transmission to the coolant inlet port and to the coolant outlet port of the cooling device does not necessarily need to be direct. This means that such a fluidic connection may also be achieved via the coolant circulation channel system of the electric machine. In any case, both the transmission and the electric machine may be cooled in an effective and efficient manner.

In an example, the electric drive train assembly further comprises a further heat exchanger being fluidically interposed between the transmission and the electric machine. Such a heat exchanger may be designated as an intermediate heat exchanger. Using such a heat exchanger allows to precisely control the temperature within the electric drivetrain assembly. In this context, different temperature levels in the transmission and the electric machine may be realized. Moreover, since two heat exchangers are used, the overall cooling performance is enhanced.

In an example, the further heat exchanger is configured to withdraw heat from the coolant while keeping the state of aggregation. This means that inside the further heat exchanger, the coolant is neither vaporized nor condensed. In an exemplary application, the coolant inside the further heat exchanger is always in the liquid state.

According to a third aspect, there is provided a method for operating a cooling device for an electric drive train component. The method comprises:

receiving gaseous coolant from the electric drive train component, transforming at least a portion of the gaseous coolant into liquid coolant, and collecting the liquid coolant in a coolant collection channel having an end being arranged adjacent to the coolant outlet port which is located on a lower vertical level than the heat exchanger and providing the liquid coolant to the electric drive train component.

In other words, when operating the cooling device, gaseous coolant is condensed. Due to the fact that a change of the state of aggregation of the coolant is allowed, the coolant is able to transport more heat than when just allowing the coolant to heat up and cool down while maintaining one state of aggregation. The heat which is stored in the gaseous cooling in the form of vaporization energy and the energy being necessary to heat up the coolant is withdrawn from the coolant by condensing and cooling down the coolant. By collecting the liquid coolant in a coolant collection channel having an end being arranged adjacent to the coolant outlet port which is located on a lower vertical level than the heat exchanger, liquid coolant is reliably and efficiently collected when exiting the heat exchanger. Since the condensed coolant is driven along the vertical direction by gravity, it creates a suction effect moving additional gaseous coolant into the heat exchanger. To this end, the coolant collection channel may at least partially extend vertically. Consequently, the coolant is drawn into the heat exchanger. This has the effect that always a sufficient amount of coolant in the liquid state may be provided by the cooling device. Thereby, the cooling device allows to control the temperature of the electric drivetrain component in an efficient, effective, and reliable manner. As before, the vertical orientation applies in an operational position of the cooling device.

In an example, the method for operating a cooling device for an electric drivetrain component is used for operating the cooling device according to the present disclosure.

According to a fourth aspect, there is provided a method for cooling an electric drive train component. The method comprises:

transforming at least a portion of liquid coolant into gaseous coolant by absorbing heat from the electric drive train component, providing the gaseous coolant to the cooling device, performing the method for operating a cooling device according to the present disclosure, and receiving liquid coolant from the cooling device.

As has already been explained before, by allowing the coolant to change the state of aggregation, more heat can be extracted from the electric drivetrain component as compared to just allowing the coolant to warm-up without changing the state of aggregation. Consequently, the electric drivetrain component can be efficiently and effectively cooled.

In an example, the electric drivetrain component is an electric machine.

In an example, the coolant is a water-based coolant. Such a coolant provides a good cooling performance and at the same time is environmentally friendly and not dangerous for humans.

According to a fifth aspect, there is provided a vehicle comprising an electric drive train assembly according to the present disclosure. As has been explained before, the drivetrain assembly may be efficiently and effectively cooled. Consequently, the electric drivetrain assembly may provide high driving performance of the vehicle.

It should be noted that the above examples may be combined with each other irrespective of the aspect involved.

These and other aspects of the present disclosure will become apparent from and elucidated with reference to the examples described hereinafter.

Examples of the disclosure will be described in the following with reference to the drawings.

DETAILED DESCRIPTION

The Figures are merely schematic representations and serve only to illustrate examples of the disclosure. Identical or equivalent elements are in principle provided with the same reference signs.

Figure 1:
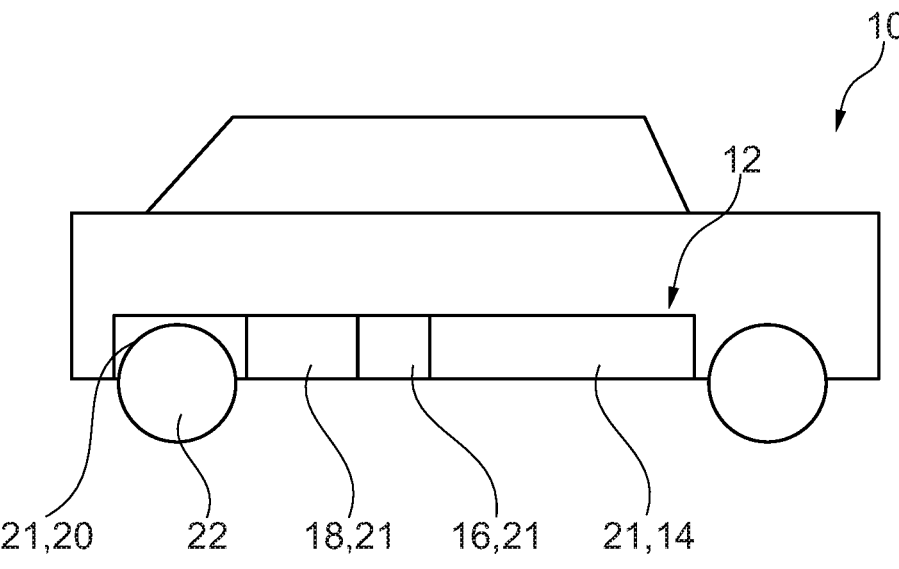
FIG. 1 shows a vehicle according to the present disclosure with an electric drive train assembly according to the present disclosure, wherein the electric drive train assembly comprises a cooling device according to the present disclosure and wherein an electric drive train component of the electric drive train assembly can be cooled using a method according to the present disclosure.

FIG. 1 shows an electric vehicle 10 comprising an electric drivetrain assembly 12.

The electric drivetrain assembly comprises 12 a battery unit 14, an inverter unit 16, an electric machine 18, and a transmission 20. More generally speaking, each of the battery unit 14, the inverter unit 16, the electric machine 18, and the transmission 20 may be called an electric drive train component 21.

The electric drivetrain assembly 12 is configured to drive the rear wheels 22 of the vehicle 10.

To this end, the battery unit 14 is electrically connected to the electric machine 18 via the inverter unit 16. The electric machine 18 is drivingly coupled to the rear wheels 22 via the transmission 20.

Figure 2:
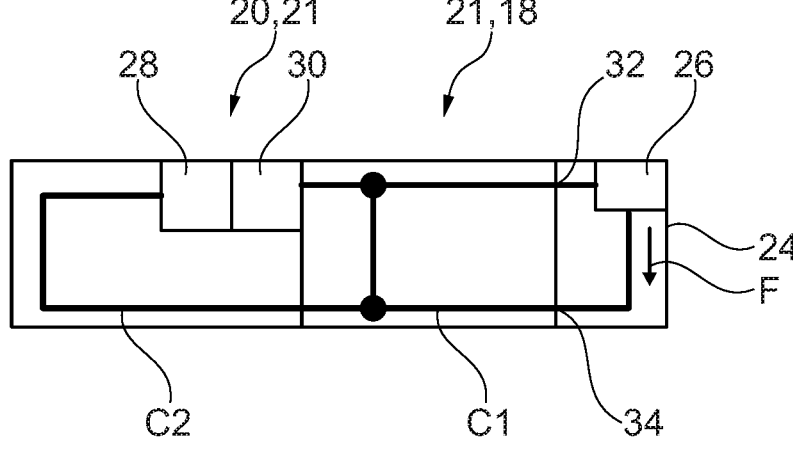
FIG. 2 shows the electric drive train assembly of FIG. 1 in a more detailed view.

The electric drivetrain assembly 12 is represented in more detail in FIG. 2.

In this representation, also components of a cooling system of the electric drivetrain assembly 12 are visible.

In this context, the electric drivetrain assembly 12 comprises a cooling device 24 which is integrated with the electric machine 18. The cooling device 24 comprises a heat exchanger 26 which in the present example is a gas-to-gas heat exchanger, i.e., a heat exchanger that is configured to transfer heat between a gaseous coolant of the cooling system and ambient air.

Moreover, the electric drivetrain assembly 12 comprises a pump 28 and a further heat exchanger 30.

In the example shown in FIG. 2, the pump 28 and the further heat exchanger 30 form part of the transmission 20. Consequently, in order to better distinguish the heat exchangers 26, 30, the further heat exchanger 30 may also be designated as a transmission heat exchanger.

The electric machine 18 comprises a coolant circulation channel system C1 along which coolant may circulate through the electric machine 18.

The coolant circulation channel system C1 is connected to a coolant inlet port 32 and a coolant outlet port 34 of the cooling device 24.

Also, the transmission 20 comprises a coolant circulation channel system C2 along which coolant may circulate through the transmission 20.

The coolant circulation channel system C2 of the transmission 20 is also fluidically connected to the coolant inlet port 32 and the coolant outlet port 34 of the cooling device 24. This is done via the electric machine 18, more precisely via the coolant circulation channel system C1 of the electric machine 18.

Thus, along the flow direction F of the coolant circulating in coolant circulation channel system C1 and coolant circulation channel system C2, the further heat exchanger or transmission heat exchanger 30 is fluidically interposed between the transmission 20 and the electric machine 18.

Figures 3, 4:
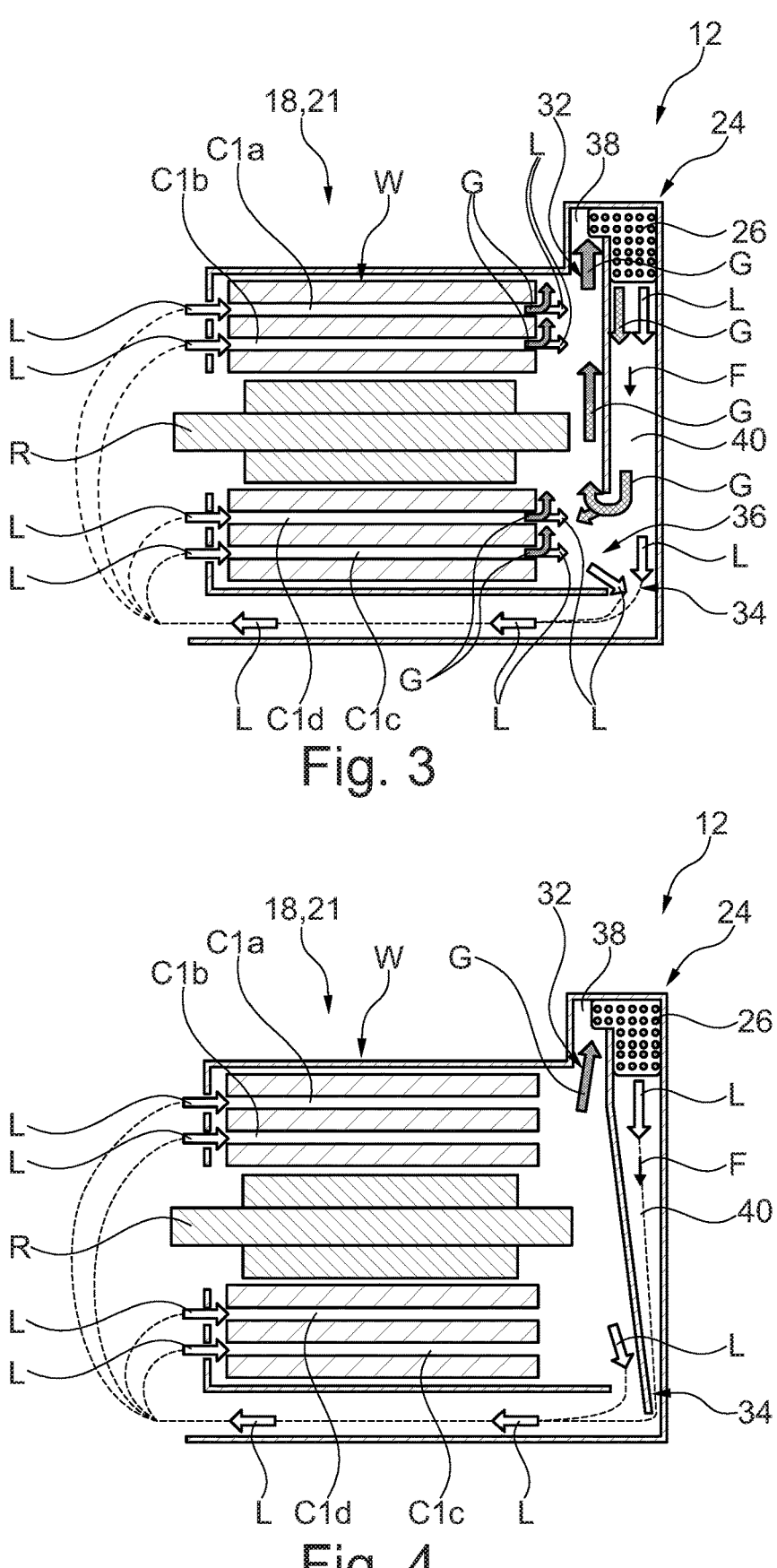
FIG. 3 shows the cooling device of FIGS. 1 and 2 according to a first example, wherein the cooling device and an electric machine are integrated.
FIG. 4 shows the cooling device of FIGS. 1 and 2 according to a second example, wherein the cooling device and an electric machine are integrated.

FIG. 3 shows a first example of the cooling device 24. The cooling device 24 is represented in its operational position. In this example, the cooling device 24 and the electric machine 18 are integrated. In the present context, this means that the components of the electric machine 18 and the components of the cooling device 24 are arranged in a common housing.

In FIG. 3, a rotor R and stator windings W of the electric machine 18 are visible.

Portions of the coolant circulation channel system C1 extend through the stator windings W. Four exemplary portions are shown and designated by C1*a*, C1*b*, C1*c* and C1*d* respectively.

Since the cooling device 24 is integrated with the electric machine 18, the coolant inlet port 32 and the coolant outlet port 34 are formed as cross-sections being arranged at the system boundary. As will be explained in more detail further below, the coolant inlet port 32 is configured to receive gaseous coolant. The coolant outlet port 34 is configured to deliver liquid coolant.

The heat exchanger 26 is, thus, configured to extract heat from the gaseous coolant such that the gaseous coolant is at least partially transformed into liquid coolant. In other words, the heat exchanger 26 is configured to condense coolant.

As has already been mentioned before, the heat exchanger 26 is a gas-to-gas heat exchanger being configured to deliver heat to ambient air.

In the example of FIG. 3, the cooling device 24 additionally comprises a recirculation port 36 which is fluidically connected to the circulation channel system C1 of the electric machine 18.

The coolant inlet port 32 is fluidically connected to the heat exchanger 26 via a channel segment 38.

In the present example, the first channel segment 38 is oriented vertically, whereas the heat exchanger 26 is arranged at a top end of the first channel segment 38.

The heat exchanger 26 is also fluidically connected to the coolant outlet port 34 and the recirculation port 36. To this end, a coolant collection channel 40 is fluidically interposed between the heat exchanger 26, the coolant outlet port 34 and the recirculation port 36.

In the example of FIG. 3, the coolant collection channel 40 is arranged below the heat exchanger 26.

A cross section of the coolant collection channel is substantially constant along the coolant flow direction F.

Moreover, the coolant collection channel 40 has an end being arranged adjacent to the coolant outlet port 34, i.e., remote from the heat exchanger 26. This end is arranged at a lower vertical level as the heat exchanger 26.

In the present example, the coolant collection channel 40 extends in a vertical direction.

In the example of FIG. 3, a water-based coolant is used and the cooling system relies on a change of the state of aggregation of the coolant.

Consequently, for cooling the electric machine 18 or, more generally an electric drivetrain component, the following method may be carried out.

In a first step S1, at least a portion of liquid coolant is transformed into gaseous coolant by absorbing heat from the electric machine 18, more precisely from the stator windings W. This is illustrated by arrow's carrying the reference sign L entering the stator windings W and arrows carrying the reference sign G exiting the stator windings W.

The portions of the liquid coolant L which are not gasified are indicated by arrows carrying the reference sign L exiting the stator windings W.

Thus, the coolant performs a change of the state of aggregation.

At the same time, a temperature of the coolant is increased due to the fact that it absorbs heat from the stator windings W.

Subsequently, in a second step, the gaseous coolant is provided to the cooling device 24 via the coolant inlet port 32.

It is noted that the gaseous coolant G is warm or hot and therefore has the tendency to climb up in a vertical direction.

The liquid coolant L exiting the stator windings W is denser than the gaseous coolant and therefore will not climb towards the coolant inlet port 32.

In a third step S3, the cooling device 24 is operated.

This means that the gaseous coolant G is received and transformed into liquid coolant using the heat exchanger 26.

In this context, the heat exchanger 26 transfers heat from the gaseous coolant G to ambient air.

At the same time, by transferring heat from the coolant to ambient air, the temperature of the coolant is reduced.

This is represented by an arrow being equipped with reference sign G entering the heat exchanger 26 and an arrow carrying reference sign L exiting the heat exchanger 26.

Since the transformation into the liquid state may be incomplete, also an arrow carrying reference signs G is shown in FIG. 3. This arrow represents coolant in gaseous form leaving the heat exchanger 26.

Both liquid coolant L and gaseous coolant G leaving the heat exchanger 26 are collected in the coolant collection channel 40. Due to the fact that the coolant exiting the heat exchanger 26 is in a liquid state and/or of a relatively cold temperature, the coolant falls vertically down.

This creates a suction effect driving additional gaseous coolant G into the heat exchanger 26.

In the present example, the coolant exiting the heat exchanger 26 in gaseous form is fed back to the electric machine 18 via the recirculation port 36. The coolant being in the liquid state leaves the cooling device 24 via the coolant outlet port 34. Thereby, liquid coolant L is provided to the electric machine 18 which can again be used to absorb heat inside the stator windings W.

It is noted that the features of step S3 may also be summarized as a method for operating a cooling device 24.

FIG. 4 shows a second example of the cooling device 24. The cooling device 24 is represented in its operational position. Also in this example, the cooling device 24 and the electric machine 18 are integrated. In the present context, this means that the components of the electric machine 18 and the components of the cooling device 24 are arranged in a common housing.

In the following, only the differences with respect to the example of FIG. 3 will be explained. Same or corresponding parts will be designated with the same reference signs.

The first difference between the examples of FIGS. 3 and 4 is that a cross-section of the coolant collection channel 40 decreases along the coolant flow direction F in the example of FIG. 4. More precisely, the cross section of the coolant collection channel 40 decreases continuously. In other words, the coolant collection channel 40 is funnel-shaped.

A further difference lies in the fact that no recirculation port is provided in the example of FIG. 4.

Beyond that, especially as far as the methods are concerned, reference is made to the explanations provided in connection with FIG. 3.

Figure 5:
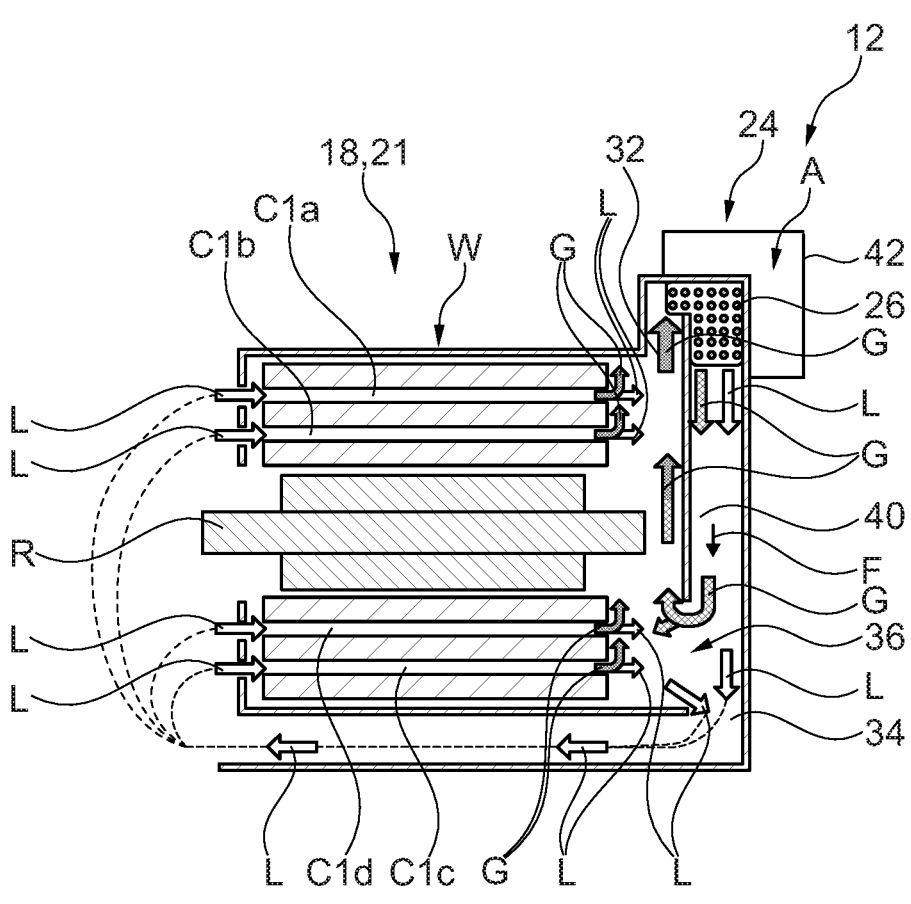
FIG. 5 shows the cooling device of FIGS. 1 and 2 according to a third example, wherein the cooling device and an electric machine are integrated.

FIG. 5 shows a third example of the cooling device 24. The cooling device 24 is represented in its operational position. Also in this example, the cooling device 24 and the electric machine 18 are integrated. In the present context, this means that the components of the electric machine 18 and the components of the cooling device 24 are arranged in a common housing.

Again, only the differences with respect to the examples which have already been explained above, will be mentioned.

The example of FIG. 5 is a variant of the example of FIG. 3.

A difference lies in that the cooling device 24 now comprises a reservoir 42 with a heat absorption liquid A arranged therein. The heat exchanger 26 is a gas-to-liquid heat exchanger.

This means, that heat being extracted from the gaseous coolant G by using the heat exchanger 26 is not transferred to ambient air anymore, but to the heat absorption liquid A being arranged in the reservoir 42. To this end, the heat exchanger 26 is thermally coupled to the reservoir 42.

Beyond that, reference is made to the above explanations.

Figure 6:
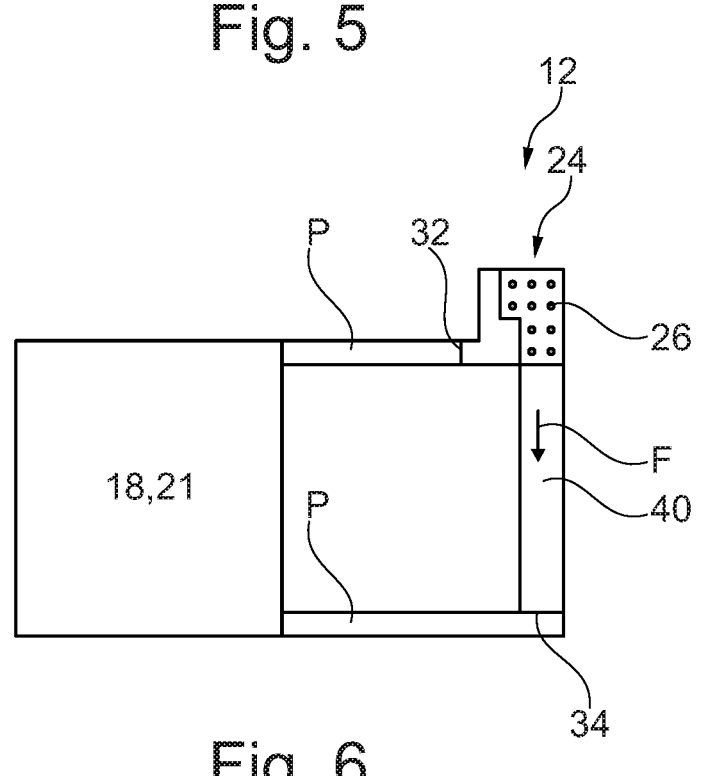
FIG. 6 shows an alternative cooling device and an electric machine, wherein the cooling device and the electric machine are not integrated.

FIG. 6 shows a fourth example of the cooling device 24. The cooling device 24 is again represented in its operational position. As before, only the differences over the examples as explained above will be mentioned.

In contrast to the above examples, the cooling device 24 is separate, i.e., not integrated, from the electric machine 18.

In this alternative, the coolant inlet port 32 and the coolant outlet port 34 are formed as connection points for a piping P or hoses which. The electric machine 18 and the cooling device 24 are fluidically connected via the piping P or hoses.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS 10 vehicle
12 electric drivetrain assembly
14 battery unit
16 inverter unit
18 electric machine
20 transmission
21 electric drive train component
22 rear wheels
24 cooling device
26 heat exchanger
28 pump
30 further heat exchanger
32 coolant inlet port
34 coolant outlet port
36 recirculation port
38 channel segment
40 coolant collection channel
A heat absorption liquid
C1 coolant circulation channel system of the electric machine
C2 coolant circulation channel system of the transmission
F coolant flow direction
G gaseous coolant
L liquid coolant
P piping

10

R rotor of the electric machine
W stator windings of the electric machine
What is claimed is:

1. A cooling device for an electric drive train component, comprising:
a coolant inlet port configured to receive a gaseous form of a coolant from the electric drive train component;
a coolant outlet port configured to deliver a liquid form of the coolant to the electric drive train component;
a heat exchanger configured to extract heat from the gaseous form of the coolant such that the gaseous form of the coolant is at least partially transformed into the liquid form of the coolant, wherein the heat exchanger is fluidically connected to the coolant inlet port and the coolant outlet port such that the heat exchanger is arranged between the coolant inlet port and the coolant outlet port along a coolant flow direction; and
a coolant collection channel fluidically connected to the heat exchanger and the coolant outlet port such that the coolant collection channel is arranged between the heat exchanger and the coolant outlet port along the coolant flow direction,
wherein a bottom end of the coolant collection channel arranged adjacent to the coolant outlet port is located on a lower vertical level than the heat exchanger in an operational position of the cooling device,
wherein a top end of the coolant collection channel is arranged below the heat exchanger in the operational position of the cooling device, and
wherein a cross section of the coolant collection channel decreases continuously along the coolant flow direction from the top end of the coolant collection channel to the bottom end of the coolant collection channel.

2. The cooling device of claim 1, wherein the heat exchanger is a gas-to-gas heat exchanger configured to deliver the heat to ambient air.

3. The cooling device of claim 1, further comprising:
a reservoir comprising a heat absorption liquid, wherein the heat exchanger is a gas-to-liquid heat exchanger being thermally coupled to the reservoir.

4. The cooling device of claim 1, wherein the coolant comprises a water-based coolant.

5. An electric drive train assembly comprising:
a cooling device for an electric drive train component, wherein the cooling device comprises:
a coolant inlet port configured to receive a gaseous form of a coolant from the electric drive train component,
a coolant outlet port configured to deliver a liquid form of the coolant to the electric drive train component,
a heat exchanger configured to extract heat from the gaseous form of the coolant such that the gaseous form of the coolant is at least partially transformed into the liquid form of the coolant, wherein the heat exchanger is fluidically connected to the coolant inlet port and the coolant outlet port such that the heat exchanger is arranged between the coolant inlet port and the coolant outlet port along a coolant flow direction, and
a coolant collection channel fluidically connected to the heat exchanger and the coolant outlet port such that the coolant collection channel is arranged between the heat exchanger and the coolant outlet port along the coolant flow direction,
wherein a bottom end of the coolant collection channel arranged adjacent to the coolant outlet port is located on a lower vertical level than the heat exchanger in an operational position of the cooling device, wherein a top end of the coolant collection channel is arranged below the heat exchanger in the operational position of the cooling device, and wherein a cross section of the coolant collection channel decreases continuously along the coolant flow direction from the top end of the coolant collection channel to the bottom end of the coolant collection channel; and an electric machine, wherein the electric machine comprises:

a coolant circulation channel system fluidically connected to the coolant inlet port and to the coolant outlet port of the cooling device.

6. The electric drive train assembly of claim 5, wherein at least a portion of at least one of the coolant collection channel or the heat exchanger is at least partially integrated into the electric machine.

7. The electric drive train assembly of claim 5, further comprising:

a transmission drivingly connected to the electric machine, wherein the transmission comprises the coolant circulation channel system fluidically connected to the coolant inlet port and to the coolant outlet port of the cooling device.

8. The electric drive train assembly of claim 7, further comprising:

a further heat exchanger fluidically interposed between the transmission and the electric machine.

9. The electric drive train assembly of claim 5, wherein the electric drive train assembly is comprised in a vehicle.

10. The electric drive train assembly of claim 5, wherein the heat exchanger is a gas-to-gas heat exchanger configured to deliver the heat to ambient air.

11. A method for operating a cooling device for an electric drive train component, comprising:

receiving a gaseous form of a coolant from the electric drive train component;

transforming at least a portion of the gaseous form of the coolant into a liquid form of the coolant; and collecting the liquid form of the coolant in a coolant collection channel having a bottom end being arranged adjacent to a coolant outlet port which is located on a lower vertical level than a heat exchanger and providing the liquid form of the coolant to the electric drive train component, wherein a top end of the coolant collection channel is arranged below the heat exchanger in an operational position of the cooling device, and wherein a cross section of the coolant collection channel decreases continuously along a coolant flow direction from the top end of the coolant collection channel to the bottom end of the coolant collection channel.

12. The method of claim 11, wherein the coolant is a water-based coolant.

13. A method for cooling an electric drive train component, comprising:

transforming at least a portion of a liquid form of a coolant into a gaseous form of the coolant by absorbing heat from the electric drive train component;

providing the gaseous form of the coolant to a cooling device;

receiving the gaseous form of the coolant from the electric drive train component;

transforming at least a portion of the gaseous form of the coolant into the liquid form of the coolant;

collecting the liquid form of the coolant in a coolant collection channel having a bottom end being arranged adjacent to a coolant outlet port which is located on a lower vertical level than a heat exchanger and providing the liquid form of the coolant to the electric drive train component, wherein a top end of the coolant collection channel is arranged below the heat exchanger in an operational position of the cooling device, and wherein a cross section of the coolant collection channel decreases continuously along a coolant flow direction from the top end of the coolant collection channel to the bottom end of the coolant collection channel; and receiving the liquid form of the coolant from the cooling device.

14. The method of claim 13, wherein the coolant is a water-based coolant.

15. The method of claim 11, wherein the heat exchanger is one of:

a gas-to-gas heat exchanger configured to deliver heat to ambient air, or a gas-to-liquid heat exchanger being thermally coupled to a reservoir comprising a heat absorption liquid.

16. The method of claim 13, wherein the heat exchanger is one of:

a gas-to-gas heat exchanger configured to deliver the heat to ambient air, or a gas-to-liquid heat exchanger being thermally coupled to a reservoir comprising a heat absorption liquid.

17. The method of claim 11, wherein the electric drive train component comprise a transmission, and wherein the transmission comprises a coolant circulation channel system fluidically connected to a coolant inlet port of the cooling device and to the coolant outlet port of the cooling device.

18. The method of claim 13, wherein the electric drive train component comprise a transmission, and wherein the transmission comprises a coolant circulation channel system fluidically connected to a coolant inlet port of the cooling device and to the coolant outlet port of the cooling device.

19. The electric drive train assembly of claim 5, further comprising:

a reservoir comprising a heat absorption liquid, wherein the heat exchanger is a gas-to-liquid heat exchanger being thermally coupled to the reservoir.

20. The cooling device of claim 1, wherein the electric drive train component comprise a transmission, and wherein the transmission comprises a coolant circulation channel system fluidically connected to the coolant inlet port and to the coolant outlet port of the cooling device.

\* \* \* \* \*